US010093327B2

(12) United States Patent
Aiken (10) Patent No.: US 10,093,327 B2
(45) Date of Patent: Oct. 9, 2018

(54) INTERLOCKING GLADHANDS

(71) Applicant: New York Air Brake, Watertown, NY (US)

(72) Inventor: Jeffrey Aiken, Watertown, NY (US)

(73) Assignee: New York Air Brake, Watertown, NY (US)

(*) Notice: Subject to any disclaimer, the term of this patent is extended or adjusted under 35 U.S.C. 154(b) by 0 days.

(21) Appl. No.: 15/281,924

(22) Filed: Sep. 30, 2016

(65) Prior Publication Data

US 2017/0210397 A1    Jul. 27, 2017

Related U.S. Application Data

(63) Continuation-in-part of application No. PCT/US2016/014267, filed on Jan. 21, 2016, which
(Continued)

(51) Int. Cl.
*F16L 37/00* (2006.01)
*B61G 5/08* (2006.01)
(Continued)

(52) U.S. Cl.
CPC ............... *B61G 5/08* (2013.01); *B60D 1/64* (2013.01); *B60T 17/043* (2013.01); *F16L 37/256* (2013.01)

(58) Field of Classification Search
CPC . B60D 1/62; B60D 1/64; F16L 37/256; F16L 33/2075; B61G 5/08
See application file for complete search history.

(56) References Cited

U.S. PATENT DOCUMENTS 157,951 A * 12/1874 Westinghouse, Jr. ........................ F16L 37/256
285/68
1,797,423 A   3/1931 Kelley
(Continued)

FOREIGN PATENT DOCUMENTS

FR    1456861         7/1966
GB    1006177 A  *  9/1965    ............ B60T 17/043

OTHER PUBLICATIONS

International Search Report and Written Opinion Form PCT/ISA/220, International Applicaiton No. PCT/US2016/014267, pp. 1-10, dated Sep. 19, 2016.

*Primary Examiner* — David Bochna
*Assistant Examiner* — James A Linford
(74) *Attorney, Agent, or Firm* — Bond Schoeneck & King, PLLC; David Nocilly (57) ABSTRACT

A gladhand coupling that prevents inadvertent separation of the coupling halves without the need for additional structure or manipulation to connect and disconnect the halves. Each half is equipped with a lug having two spaced apart ramped pads and a flange defining a channel having a corresponding ramped pad. When two halves are positioned together then rotated into the locked position, the ramped pad of the flange is positioned proximately to the either of the ramped pads of the flange to prevent inadvertent lateral compression of the two halves that would otherwise cause unintentional uncoupling. The coupling may be disconnected by simple rotation of one coupling half relative to the other so that the ramped pad of the lug is positioned between the spaced apart ramped pads of the lug and by pulling the coupling apart as done by current rail car decoupling procedures.

10 Claims, 9 Drawing Sheets

Related U.S. Application Data is a continuation-in-part of application No. 15/003,104, filed on Jan. 21, 2016, now Pat. No. 10,005,478.

(51) Int. Cl.
*B60T 17/04* (2006.01)
*B60D 1/64* (2006.01)
*F16L 37/256* (2006.01)

(56) References Cited

U.S. PATENT DOCUMENTS

| | | | | |
|---|---|---|---|---|
| 2,535,740 | A | | 12/1950 | Knopp |
| 3,052,489 | A | * | 9/1962 | Stoudt .................. F16L 37/256 285/16 |
| 3,241,865 | A | * | 3/1966 | Pumphrey ............. B60T 17/043 280/421 |
| D224,107 | S | * | 7/1972 | Mastis ......................... D23/263 |
| 4,366,965 | A | * | 1/1983 | Rhodes ................... B60D 1/62 137/351 |
| 5,129,243 | A | * | 7/1992 | Kassebaum ........... B60T 17/043 303/69 |
| 5,240,311 | A | * | 8/1993 | Bunker ................ B60T 17/043 277/609 |
| 2007/0209705 | A1 | * | 9/2007 | Nichols ................ B60T 17/043 137/204 |

* cited by examiner

INTERLOCKING GLADHANDS

CROSS-REFERENCE TO RELATED APPLICATIONS

The present application is a continuation-in-part of U.S. application Ser. No. 15/003,104 filed on Jan. 21, 2016 and PCT Application No. PCT/US16/14267, filed on Jan. 21, 2016.

BACKGROUND OF THE INVENTION

1. Field of the Invention

The present invention relates to air brake hose connectors and, more particularly, to a connector having a mechanical interlock to prevent inadvertent decoupling.

2. Description of the Related Art

Air brake hose couplers, typically referred to as gladhand connectors, have two interlocking members fitted to the hoses that supply pressurized air from a locomotive to the railway air brakes of the railroad cars of a train and then coupled together to join the hoses together. Conventional gladhands used throughout in the rail industry do not include any mechanism that locks the gladhands together when in the coupled position. Instead, the prevailing gladhand design uses the compression of a rubber gasket between the faces of the two gladhands as the sole means to hold a rib in a groove, thus holding the gladhands together. This approach has proven to be unreliable in the field, however, as it is easily disconnected by involuntary forces, such as hose vibration. While the art includes locking mechanisms for gladhands, these approaches have not been adopted in the field because they require that the gladhands be unlocked through additional steps or manipulation that are not practical for current methods of rail car separation or compliant with the applicable industry regulations and standards, such as those promulgated by the Association of American Railroads (AAR). Thus, there is a need in the art for a gladhand design that mitigates the risk of unintended hose separation but allows for disconnection without additional steps or structure.

BRIEF SUMMARY OF THE INVENTION

The present invention comprises a gladhand coupling having a coupling half having a face with an opening therethrough, a locking lug extending outwardly from the face of said coupling half and having a first ramped pad positioned at a predetermined location about the face and a ridge extending outwardly therefrom, and a flange extending from the face and having a second ramped pad positioned oppositely about the face from the first ramped pad, a third ramped pad spaced apart from the second ramped pad to define a slot therebetween, and a groove formed therein that corresponds to the ridge of the locking lug. A second gladhand coupling a second face with a second opening therethrough, a second locking lug extending outwardly from the second face of said second coupling half and having a fourth ramped pad positioned at a predetermined location about the second face and a second ridge extending therefrom, and a second flange extending from the second face and having a fifth ramped pad positioned oppositely about the second face from the third ramped pad, a sixth ramped pad spaced apart from the second ramped pad to define a second slot therebetween that can accept the first ramped pad, and a second groove extending therefrom may be connected to the first gladhand coupling half. The first coupling half and the second coupling half are movable between a disconnected position, wherein the first and fifth ramped pads are misaligned and the second and fourth ramped pads are misaligned, and a connected position, wherein the first and fifth ramped pads are aligned and the second and fourth ramped pads are aligned. The first coupling half and second coupling half are oriented at other than 180 degrees to each other when in the connected position. The first coupling half and the second coupling half are also movable into a released position where the fourth ramped pad can pass through the first slot and the first ramped pad can pass through the second slot. The first coupling half and second coupling half are oriented at about 180 degrees in the released position.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
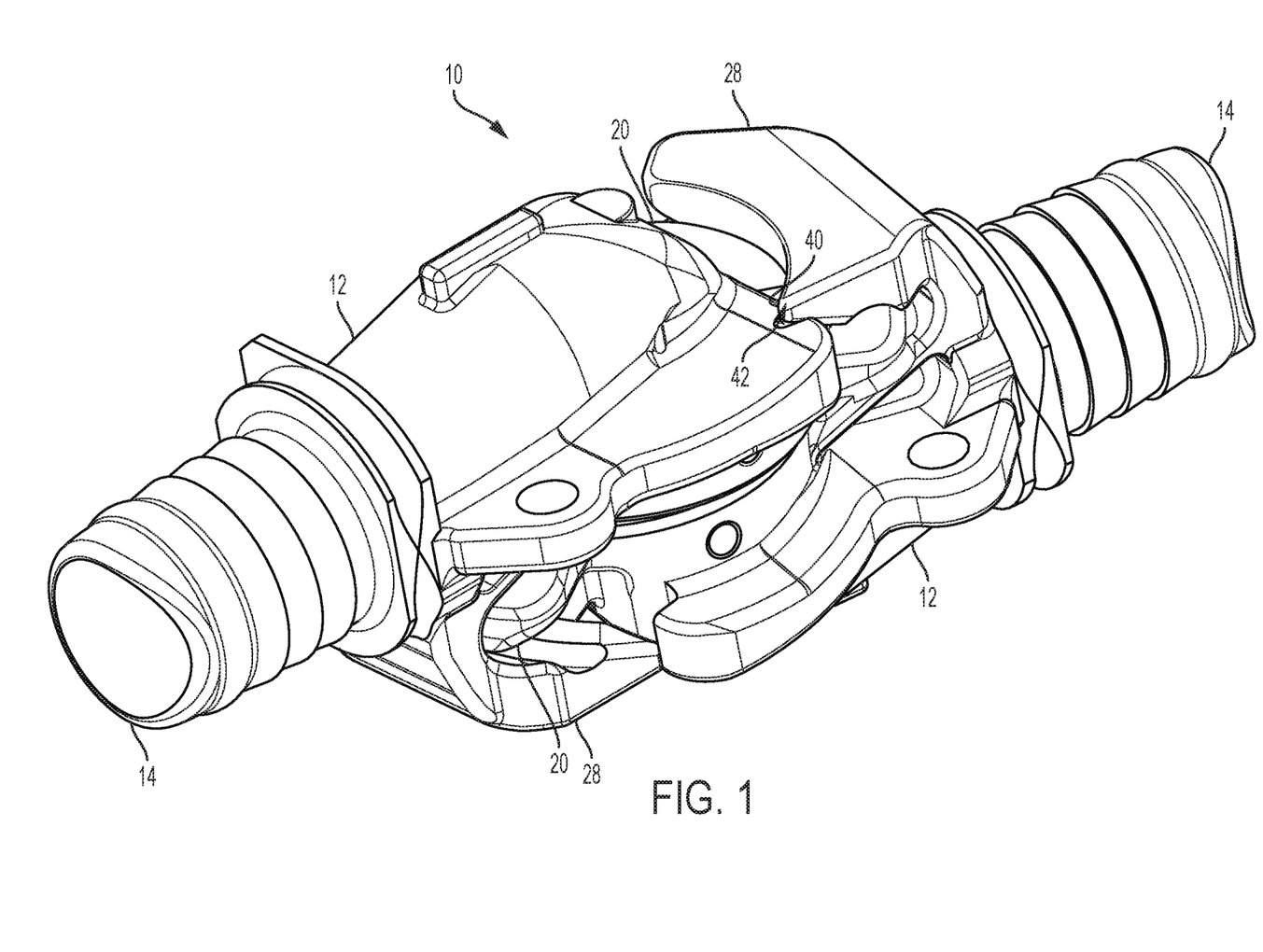
FIG. 1 is a perspective view of a gladhand coupling according to the present invention.
Figure 2:
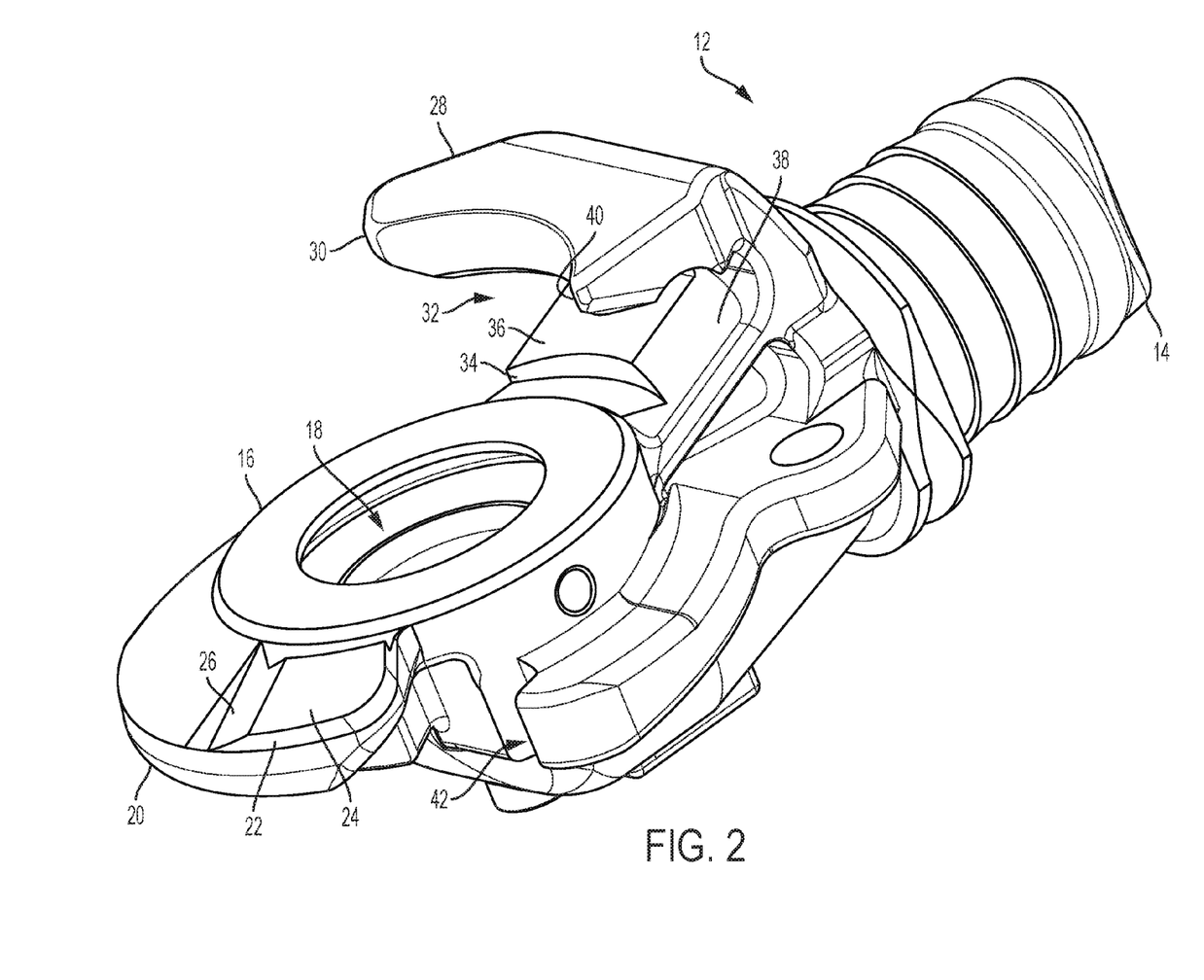
FIG. 2 is a perspective view of a gladhand coupling half according to the present invention.
Figure 3:
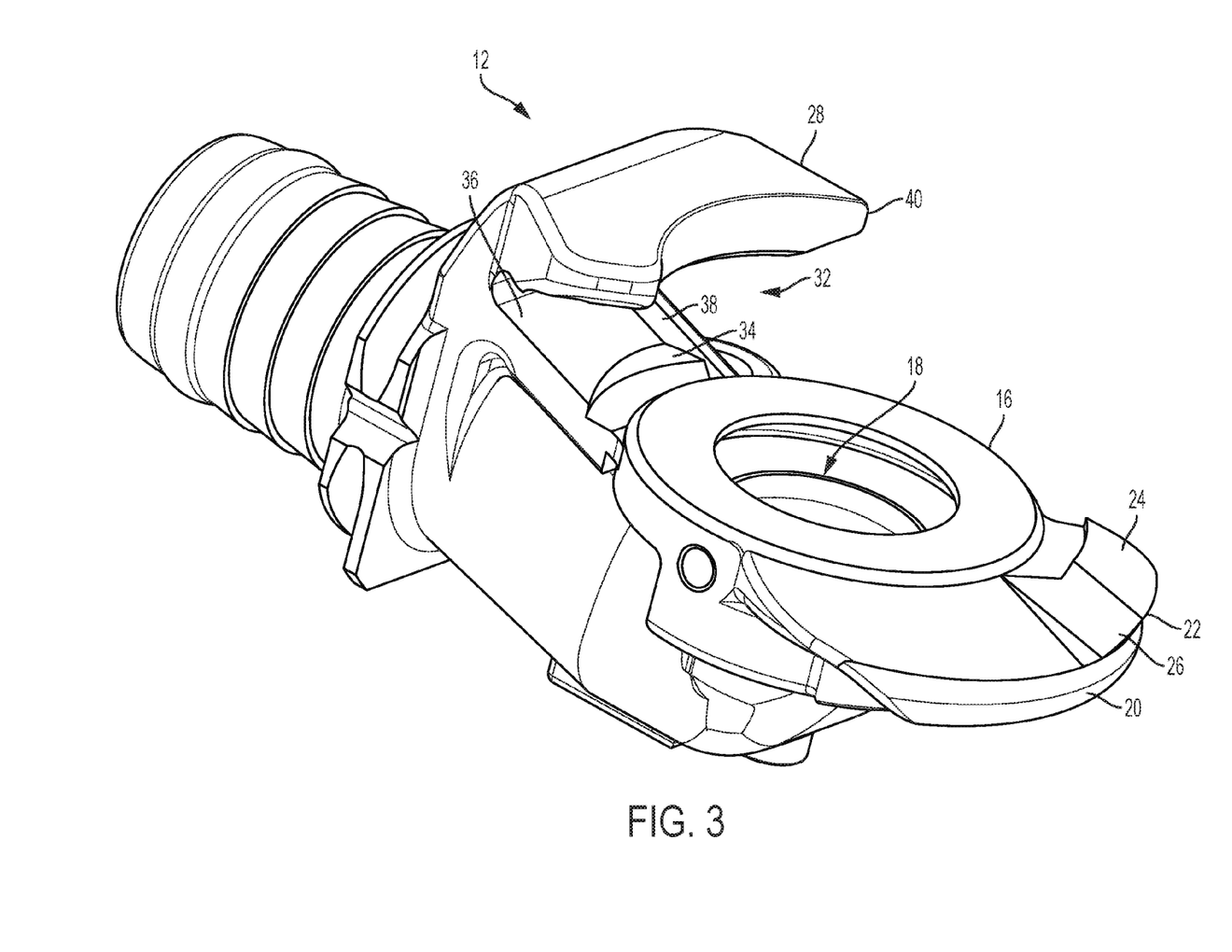
FIG. 3 is another perspective view of a gladhand coupling half according to the present invention.
Figure 4:
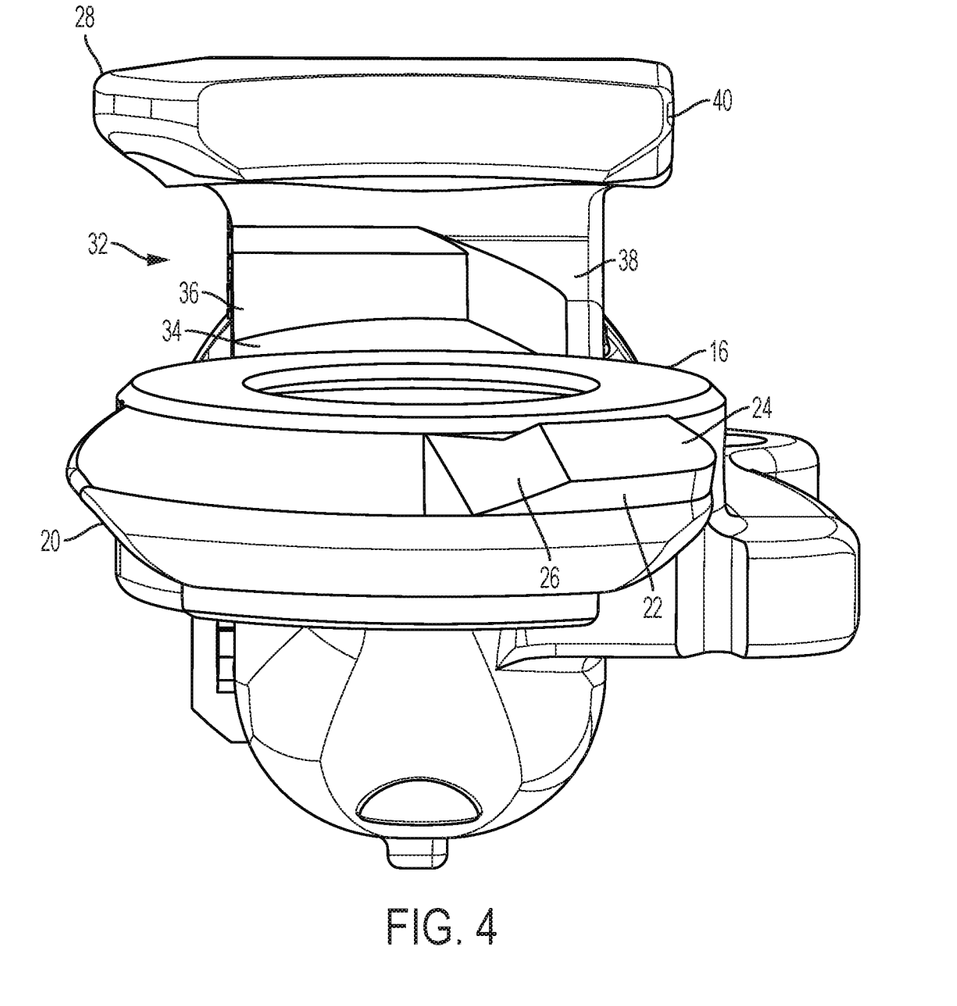
FIG. 4 is front view of a gladhand coupling half according to the present invention.
Figure 5:
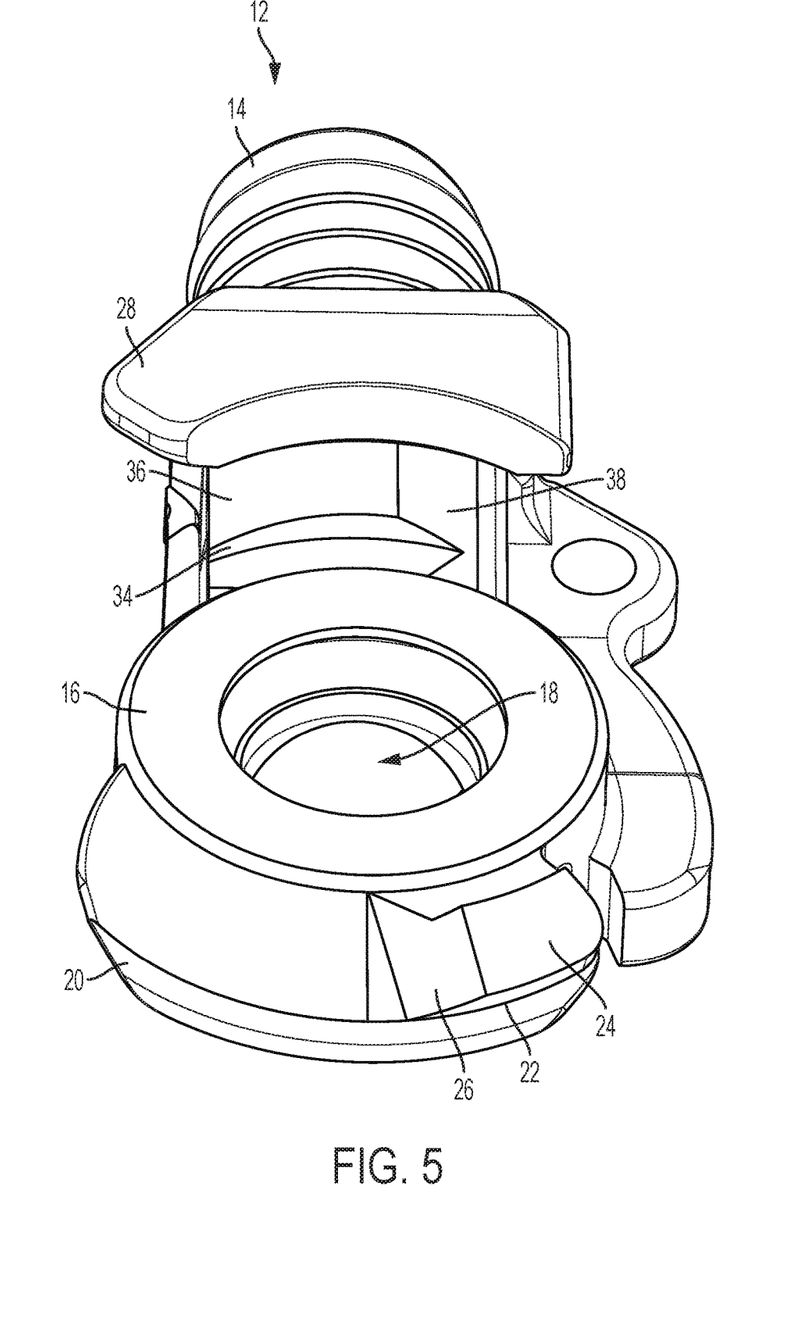
FIG. 5 is an isometric view of a gladhand coupling half according to the present invention.

Referring now to the drawings, wherein like reference numerals refer to like parts throughout, there is seen in FIGS. 1 through 5, a gladhand coupling 10 comprising a pair of coupling halves 12 that may be rotatable coupled together. Each coupling half 12 includes an air hose shank 14 for the connecting an air hose (not shown) to coupling half 12. Referring to FIGS. 2 and 3, coupling half 12 is hollow and includes face 16 extending along a plane on one side of coupling half 12 and having an opening 18 formed therethrough to define an air passage that is in fluid communication with the interior of connector 14 and thus the internal diameter of an air hose attached thereto. As with conventional gladhands, coupling 10 is connected and disconnected by rotating one coupling half 12 relative to another coupling half 12, thereby connecting and disconnecting the air hoses coupled to the shanks 14 of each coupling half 12. All of the elements of gladhand coupling 10 may be formed via metal casting when manufacturing coupling 10.

Figure 6:
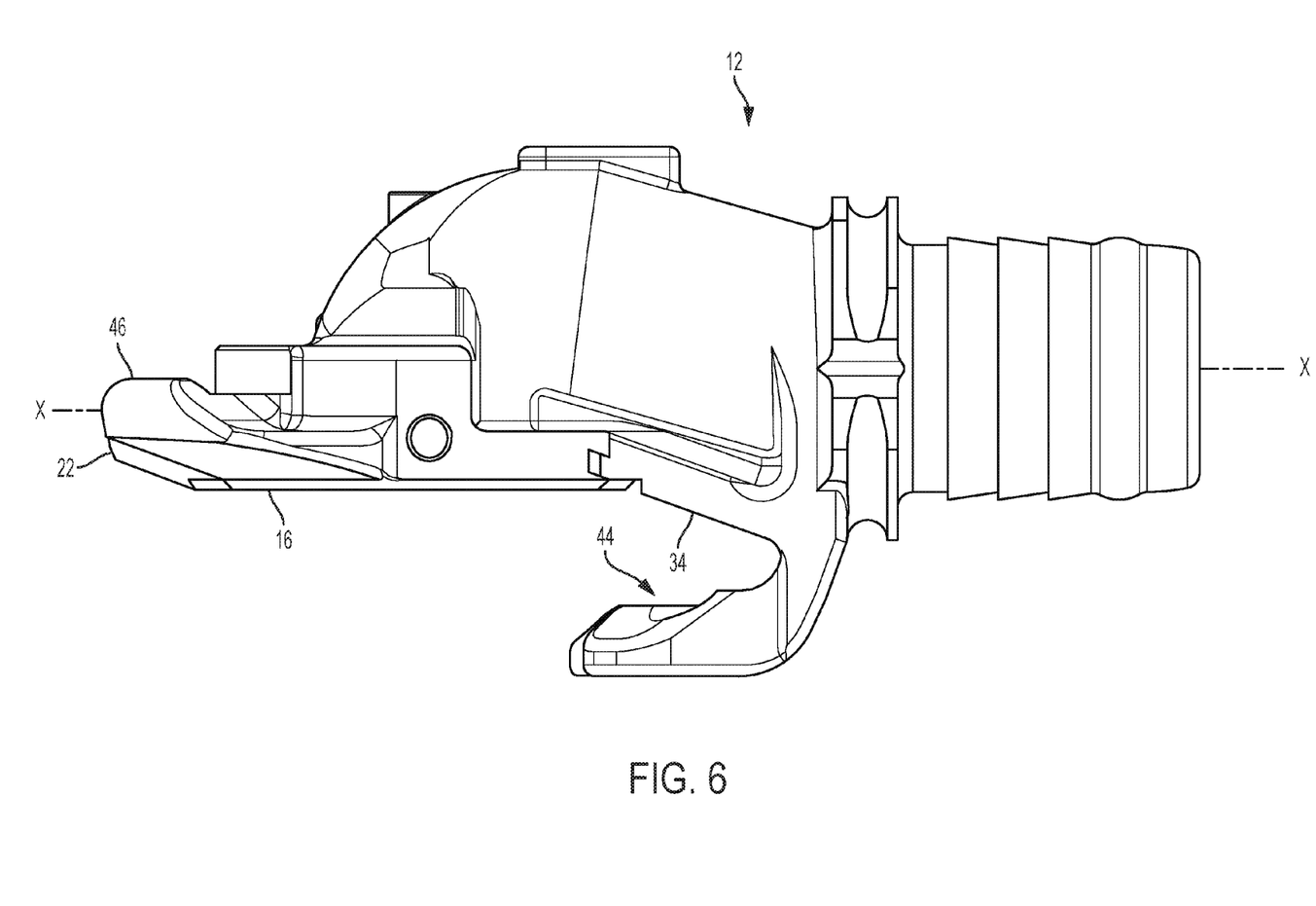
FIG. 6 is a perspective view of a gladhand coupling half according to the present invention.
Figure 7:
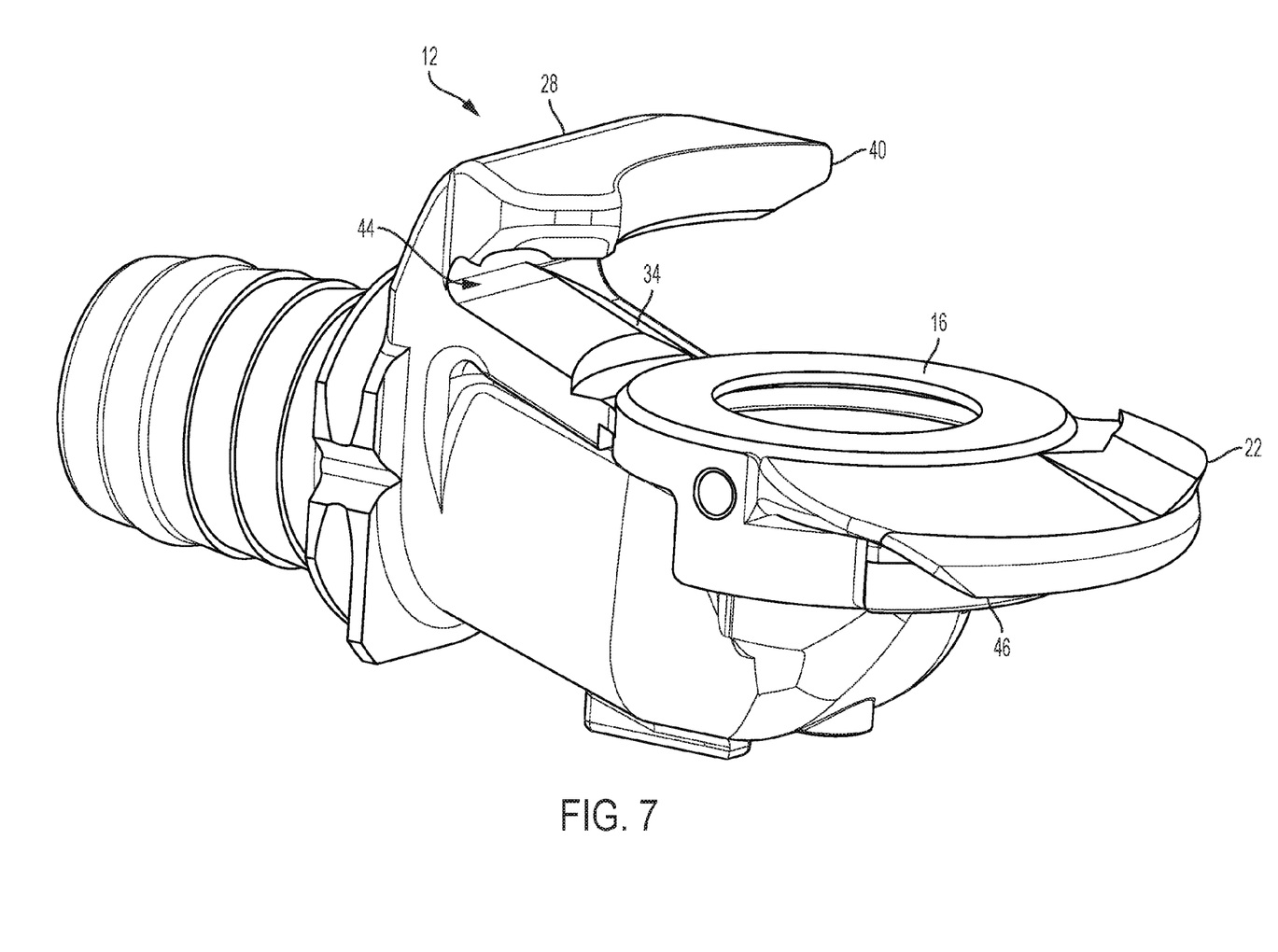
FIG. 7 is a perspective view of a gladhand coupling half according to the present invention.

Referring to FIGS. 2 through 5, each coupling half 12 includes a locking lug 20 extending outwardly from the periphery of face 16 along a plane parallel to axis X-X. Lug 20 has a first ramped pad 22 defined by a conical portion 24, i.e., the surface of conical portion 24 extends conically relative to face 16, and a ramped surface 26 leading to conical portion 24 from the remaining surface of lug 20 that is conical relative to face 16. Coupling half 12 further includes an L-shaped annular flange 28 positioned approximately oppositely about face 16 of coupling half 12 from ramped pad 22 of lug 20. Flange 28 includes a pair of legs 30 that extends over face 16 to define a channel 32 that is adapted to receive a lug 20 of another coupling half 12. The lower portion of flange 28 includes a second ramped pad 34 having a conical portion 36 and a ramped portion 38 leading to conical portion 36 that correspond in positioning and conical angle to conical portion 24 and a ramped surface 26 of lug 20. Referring to FIGS. 6 and 7, conical portion 24 and conical portion 36 extend about face 16 of coupling half 12 at matching angles relative to longitudinal axis X-X of coupling half 12.

Each coupling half 12 further includes a pointed leg 40 on flange 28 and a notch 42 positioned at one end of lug 20 so that when two coupling halves 12 are connected together, leg 40 of flange is received in notch 42, thereby forming a stop that prevents rotations of coupling halves 12 past the locked position of gladhand coupling 10 seen in FIG. 1, where each coupling half 12 is positioned at less than 180 degrees relative to the other coupling half 12. Rotation of coupling halves 12 toward a 180 degree offset position allows coupling 10 to unlock as ramped pads 22 and 34 are no longer aligned opposite each other thereby allowing the resilient gasket to compress and coupling 10 to uncouple by pulling ridge 46 out of groove 44 when rail cars are separated normally.

As further seen in FIGS. 6 and 7, each coupling half 12 also includes an arcuate groove 44 formed in the interior surface of flange 28 and a corresponding arcuate ridge 46 formed on the exterior surface of lug 20. Ridge 46 and groove 44 are dimensioned and positioned so that ridge 46 of one coupling half 12 will slide into groove 44 of a mating coupling half 12 and continue sliding until the legs 40 of each half 12 engage the corresponding notches 42 of the other halves 12 as two coupling halves 12 are rotated toward the locked position. Ridge 46 is held in groove 44 by the opposing forces from the resilient gaskets seated in bore 18.

Coupling halves 12 are joined to form gladhand coupling 10 by positioning the respective faces 16 of two coupling halves 12 against each other so that the longitudinal axes are misaligned, and then rotating one coupling half 12 relative to the other coupling half 12 past a 180 degree orientation until lug 20 of one coupling half 12 slides completely into channel 32 of flange 28 of the other coupling half 12, ridge 46 slides fully into groove 44, and pointed leg engages notch 42. As halves 12 are rotated toward the locked position of FIG. 1, ridge 46 and groove 44 urge halves 12 together, thereby compressing any sealing gasket (not shown) that is positioned between the two halves 12. Because sealing gaskets are resilient, the biasing forces produced by the sealing gasket will help maintain gladhand coupling 10 in the locked position by keeping ridge 44 seated in groove 46.

Gladhand coupling 10 prevents inadvertent separation of halves 12 as follows. As coupling halves 12 are rotated into the locked position, sloped surfaces 26 and 38 guide surfaces 24 and 36 into opposing alignment despite any dimensional tolerances of the two coupling halves 12 and sealing gasket. Once gladhand coupling 10 is moved into the fully locked position of FIG. 1, surface 24 of one half 12 is directly opposite surface 36 of the opposing half 12 and spaced apart therefrom by an extremely minimal distance, such as between 0.00 inches and 0.06 inches thereby preventing coupling halves 12 from being compressed laterally enough that coupling halves 12 have the freedom to uncouple unintentionally. Due to the limited distance between these two surfaces, any inadvertent lateral forces applied to coupling 12 will be unable to compress the gasket positioned between the two halves 12 sufficiently to loosen coupling 10 such that ridge 44 of locking lug 20 of each half 12 is free to slide out of groove 44 of flange 28 of the other half 12. Rotational movement of coupling halves 12 will move flat surfaces 24 and 36 out of alignment so that coupling halves 12 can compress sealing gasket sufficiently to allow each ridge 44 of each locking lug 20 to slide out of each groove 44 of each flange 28. Alternatively, ramped pads 22 and 34 may be dimensioned and positioned to become mechanically coupled when coupling halves 12 are rotated together into the locked position of FIG. 1. This embodiment requires machining of surfaces 24 and 36 to be shallow ramps such that the highpoint created by the intersection of ramps 26 and 24, and the highpoint created by the intersection of ramps 36 and 38, need to be forced past each other to reach the fully locked position. The resulting mechanical interference between these two high points would help retain coupling 10 in the fully engaged position until they were forcefully pulled apart by the train in an intentional uncoupling event.

The intentional uncoupling of a gladhand coupling, including gladhand coupling 10, involves using the train to pull the brake hoses tight, which forces halves 12 to rotate toward 180 degree opposite alignment relative to each other. As halves 12 rotate, the opposing ramped pads 22 and 34 rotate out of alignment allowing the resilient gaskets to compress sufficiently to allow ridge 46 to be pulled out of groove 44 by the train car forces so that coupling halves 12 can separate. Gladhand coupling 10 thus remains free for normal disconnection of gladhand couplings by an intentional rotation of halves 12 relative to each other, such as during a rail yard pull-apart, but reduces the incidents of inadvertent disconnection when in locked position. As no additional latches or locking mechanisms need to be manipulated to unlock coupling halves 12, coupler 10 can be disconnected simply by rotating the two coupling halves 12 relative to each other as is the practice with conventional gladhands, or pulling them apart as described above, thereby providing for a secure mechanical interconnection without the need for complex locking structure that must be separately unlocked before gladhand coupling 10 can be open to disconnect air hoses connected thereto.

Figure 8:
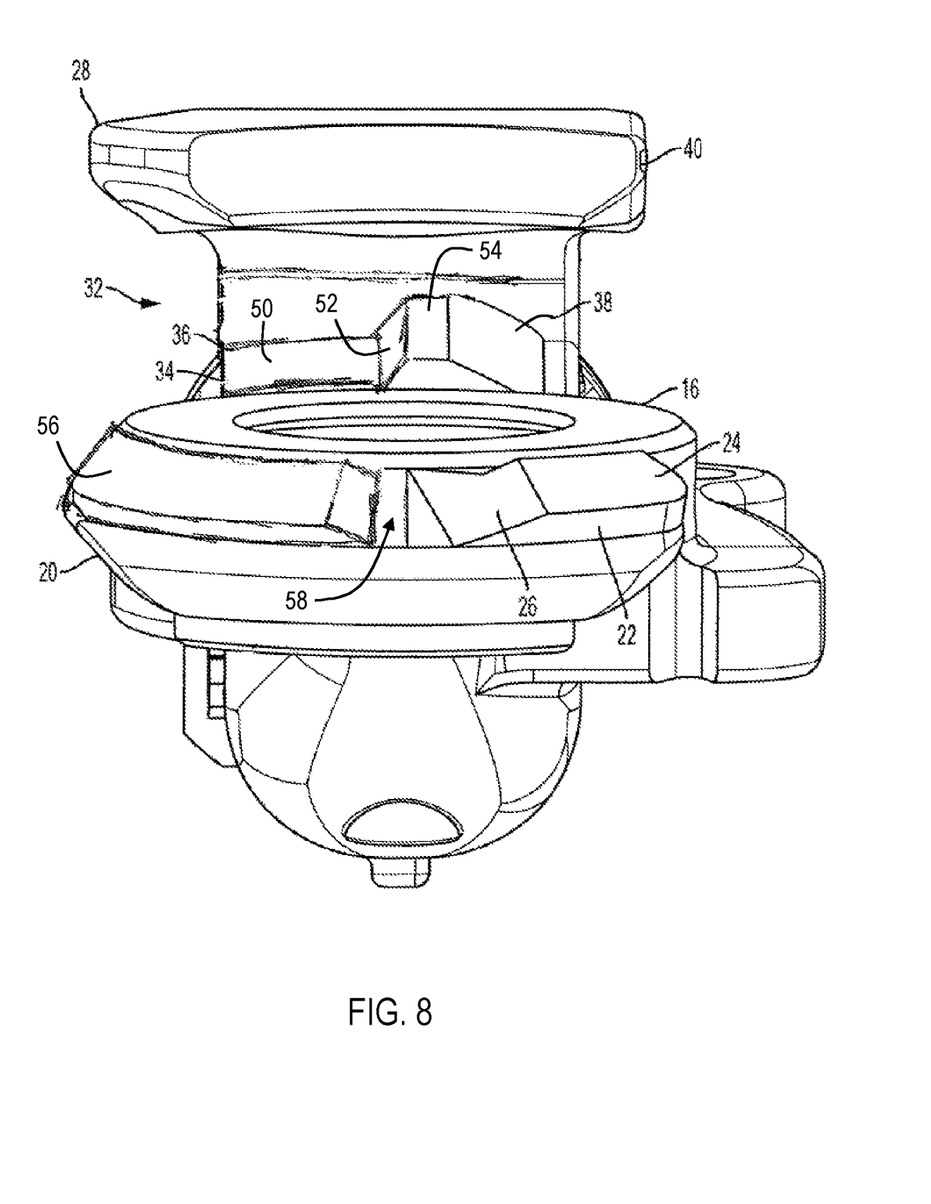
FIG. 8 is a front view of another embodiment of a gladhand coupling half according to the present invention.
Figure 9:
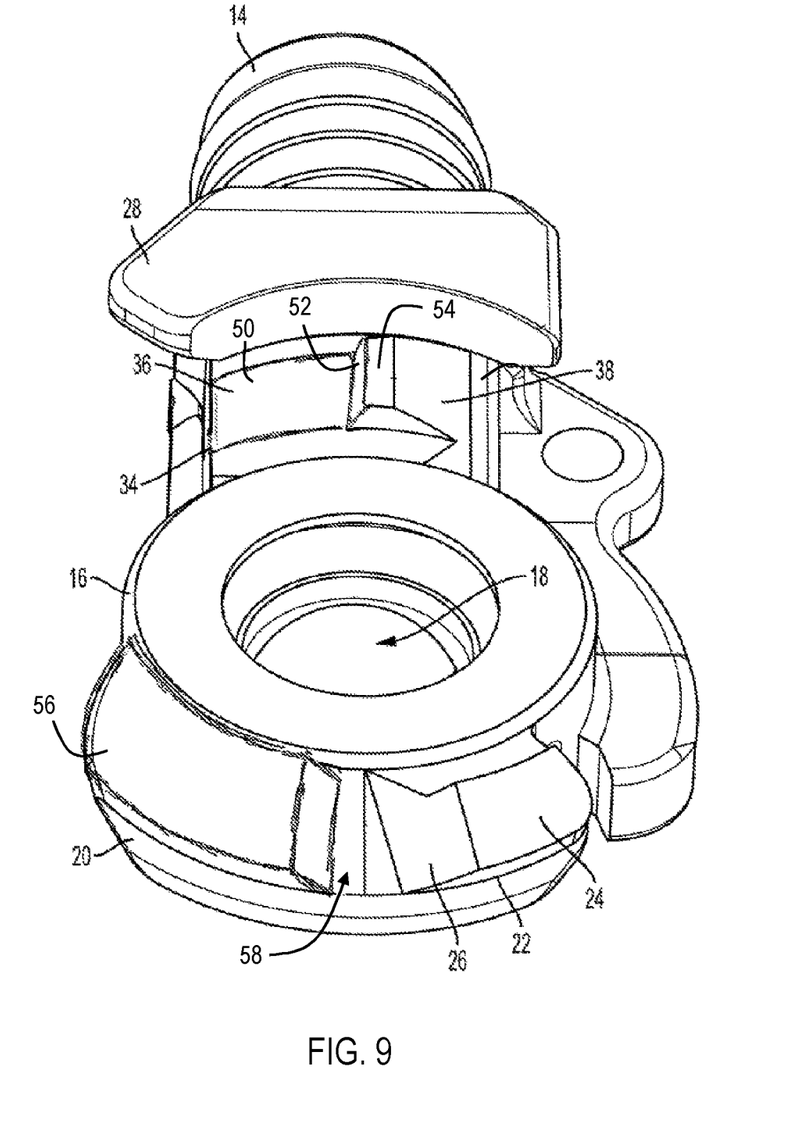
FIG. 9 is a perspective view of another embodiment of a gladhand coupling half according to the present invention.

Referring to FIG. 8, in another embodiment of coupling 10, ramp 36 of ramped pad 34 on the same side of coupling half 12 as face 16 may be shaped to define a first portion 50 that is substantially flat, a second portion 52 that slopes steeply upward, and narrow pad 54 that is substantially flat and proximate to descending ramp 38. A third ramped pad 56 is positioned about locking lug 20 on the same side of coupling 12 as ramped pad 22 and spaced apart from ramped surface 26 and conical portion 24 of ramped pad 22 to define a separation slot 58 therebetween. Slot 58 is positioned so that it aligns with narrow pad 54 when coupling halves 12 are positioned at approximately 180 degrees relative to each other. Accordingly, coupling halves 12 may be engaged by positioning at approximately 90 degrees relative to each other and rotated. Narrow pad 54 will interface with second ramped pad 56 to prevent inadvertent unlocking of coupling halves 12 should coupling halves 12 not be fully rotated past 180 degrees into the fully locked position. Narrow pad 54 will also, as explained above, cooperate with ramped pad 22 to prevent inadvertent uncoupling when coupling halves are rotated past 180 degrees into the full locked position. Due to the relative positioning of slot 58 to narrow pad 54, coupling halves 12 are free to uncouple when coupling halves 12 are rotated into the 180 degree orientation relative to each other, such as during an intentional uncoupling event. Thus, this embodiment of coupling 10 prevents inadvertent separation of coupling halves 12 in nearly all orientations after initial coupling other than the orientation where glandhands 10 are intended to and remain free to automatically uncouple when intentionally pulled apart in an uncoupling event. As seen in the FIG. 9, ramped pad 22, narrow pad 54, and third ramped pad 56 are arched circumferentially around the face on the top side and the combined circumferential length of ramped pad 22 and third ramped pad 56 is longer than the circumferential length of the narrow pad 54.

What is claimed is:

1. A gladhand coupling, comprising:
    a coupling half having a face on a top side of the coupling half with an opening therethrough;
    a locking lug extending outwardly from the face of said coupling half;
    a first ramped pad positioned on the locking lug on the top side of the coupling half;
    a flange extending outwardly from the face;
    a second ramped pad positioned on the flange and on the top side of the coupling half; and
    a third ramped pad positioned on the locking lug on the top side of the coupling half and spaced apart from the first ramped pad to define a separation slot therebetween, wherein the slot is positioned at 180 degrees relative to the second ramped pad of the flange;
    wherein first ramped pad, the second ramped pad, and the third ramped pad are arched circumferentially around the face on the top side and wherein a combined circumferential length of the first ramped pad and third ramped pad is longer than the circumferential length of the second ramped pad;
    a second coupling half having a second face on a top side of the second coupling half with a second opening therethrough;
    a second locking lug extending outwardly from the second face of said second coupling half;
    a fourth ramped pad positioned on the second locking lug on the top side of the second coupling half;
    a second flange extending outwardly from the second face;
    a fifth ramped pad positioned on the second flange and on the top side of the second coupling half;
    a sixth ramped pad positioned on the second locking lug on the top side of the second coupling half and spaced apart from the fourth ramped pad to define a second separation slot therebetween that is positioned at 180 degrees relative to the fifth ramped pad and that can accept the second ramped pad therebetween;
    wherein fourth ramped pad, the fifth ramped pad, and the sixth ramped pad are arched circumferentially around the face on the top side and wherein a combined circumferential length of the fourth ramped pad and sixth ramped pad is longer than the circumferential length of the fifth ramped pad;
    wherein the first coupling half and the second coupling half are movable between a disconnected position, wherein the first and fifth ramped pads are misaligned and the second and fourth ramped pads are misaligned, and a connected position, wherein the first and fifth ramped pads are aligned and the second and fourth ramped pads are aligned.

2. The coupling of claim 1, wherein the flange includes a leg defining a channel above the second ramped pad.

3. The coupling of claim 2, wherein the channel is dimensioned to receive a locking lug of a second coupling half.

4. The coupling of claim 3, wherein the first ramped pad comprises a conical portion and a ramped portion.

5. The coupling of claim 4, wherein the second ramped pad comprises a second conical portion and a second ramped portion.

6. The coupling of claim 5, wherein the first coupling half and second coupling half are oriented at other than 180 degrees to each other when in the connected position.

7. The coupling of claim 6, wherein the first coupling half and the second coupling half are movable into a released position where the fifth ramped pad can pass through the first slot and the second ramped pad can pass through the second slot.

8. The coupling of claim 6, wherein the first and fifth ramped pads are spaced apart less than 0.06 inches when the coupling is in the connected position.

9. The coupling of claim 7, wherein the first coupling half and second coupling half are oriented at about 180 degrees in the released position.

10. The coupling of claim 7, wherein the second and sixth ramped pads are spaced apart less than 0.06 inches when the coupling is in the connected position.

* * * * *